(12) United States Patent
Huang

(10) Patent No.: US 11,872,098 B1
(45) Date of Patent: Jan. 16, 2024

(54) ELECTRIC TOOTHBRUSH HEAD

(71) Applicant: Lei Huang, Ruijin (CN)

(72) Inventor: Lei Huang, Ruijin (CN)

( * ) Notice: Subject to any disclaimer, the term of this patent is extended or adjusted under 35 U.S.C. 154(b) by 0 days.

(21) Appl. No.: 18/483,276

(22) Filed: Oct. 9, 2023

(51) Int. Cl.
*A61C 17/22* (2006.01)

(52) U.S. Cl.
CPC .......... *A61C 17/225* (2013.01); *A61C 17/222* (2013.01)

(58) Field of Classification Search
CPC ...... A61C 17/225; A61C 17/22; A46B 5/0095
See application file for complete search history.

(56) References Cited

U.S. PATENT DOCUMENTS

| | | | |
|---|---|---|---|
| 10,912,377 B1 | 2/2021 | Kuang | |
| 11,096,768 B1 * | 8/2021 | Lin | ...................... A61C 17/222 |
| 11,207,162 B1 | 12/2021 | Liu | |
| 11,291,294 B1 | 4/2022 | Huang | |
| 11,666,137 B2 * | 6/2023 | Kuang | ...................... A46B 9/04 15/22.1 |
| 11,730,580 B1 | 8/2023 | Tang | |
| 2019/0174909 A1 * | 6/2019 | Huang | ...................... F16D 1/05 |
| 2022/0104610 A1 | 4/2022 | Huang | |

* cited by examiner

*Primary Examiner* — Shay Karls

(57) ABSTRACT

The application discloses an electric toothbrush head mounted on a driving handle, comprising: a toothbrush head body provided with a connection hole; a connection component mounted in the connection hole and used to connect the toothbrush head body with the driving handle; wherein the connection component comprises a tail hood for being inserted and received in the connection hole; and wherein the tail hood sequentially comprises a middle main shell; the middle main shell is provided with an elastic arm, and the elastic arm is provided with a first boss abutted against the driving handle; an outer side of the middle main shell is wrapped with an elastic piece; an outer side of the tail hood is further sleeved with a silicone sleeve. The application solves the problems in the existing electric toothbrush heads, such as large vibration and noise, and poor user experience.

12 Claims, 4 Drawing Sheets

ELECTRIC TOOTHBRUSH HEAD

TECHNICAL FIELD

The present utility model relates to the technical field of electric toothbrushes, and in particular, to an electric toothbrush head.

BACKGROUND

Electric toothbrushes are popular in the market due to their good cleaning effects. When the electric toothbrush is working, the driving component drives the toothbrush head to generate high-frequency vibrations, to decompose the toothpastes into fine foams to deeply clean slits between the teeth, and meanwhile, the vibration of the bristles can promote blood circulation in the oral cavity and have a massage effect on the gingival tissues. Traditional vibrating toothbrush heads have an unsatisfactory hand feel in use, have a large vibration and noise, and cause hand numbness, which leads to poor use experience to users.

SUMMARY

A primary objective of the present utility model is to provide an electric toothbrush head, which aims to solve the problems in the existing electric toothbrush heads, such as large vibration and noise, and poor user experience.

In order to achieve the objective, the present utility model provides an electric toothbrush head mounted on a driving handle, comprising:

a toothbrush head body provided with a connection hole;

a connection component mounted in the connection hole and used to connect the toothbrush head body with the driving handle; wherein the connection component comprises a tail hood for being inserted and received in the connection hole, and the driving handle is inserted into the tail hood; and wherein the tail hood sequentially comprises a front flat part, a middle main shell, and a tail auxiliary shell; the front flat part is used to prevent a relative rotation between the tail hood and the connection hole, the middle main shell is provided with an elastic arm, the elastic arm is used to press the driving handle tight, and the elastic arm is provided with a first boss abutted against the driving handle; an outer side of the middle main shell is wrapped with an elastic piece, and the elastic piece is used to press the elastic arm tight on the driving handle; an outer side of the tail hood is further sleeved with a silicone sleeve, the silicone sleeve is used for filtering and shock absorption, and the tail hood is tightly attached to the connection hole with the silicone sleeve.

Optionally, the elastic arm is further provided with a second boss, and the second boss is abutted against the elastic piece.

Optionally, the middle main shell is provided with a guide boss, and the connection hole is internally provided with a guide groove adapted to the guide boss.

Optionally, an end that is of the guide boss and that is in proximity to the front flat part is provided with a first chamfer.

Optionally, the elastic piece is provided with a slot for inserting and receiving the guide boss.

Optionally, an end of the slot is provided with a second chamfer.

Optionally, the silicone sleeve is sleeved on the outer side of the middle main shell and an outer side of the tail auxiliary shell.

Optionally, the outer side of the tail auxiliary shell is provided with a locking boss, and the toothbrush head body is provided with a locking hole for clamping engagement with the locking boss.

Optionally, the outer side of the tail auxiliary shell is further provided with a fool-proof boss, and an inner side of the connection hole is provided with a fool-proof slot for clamping engagement with the fool-proof boss.

Optionally, the connection component further comprises an iron ring for connection with an end of the tail auxiliary shell, and the iron ring is arranged between the tail auxiliary shell and the driving handle.

Optionally, the driving handle is provided with several anti-slip grooves, and the anti-slip grooves correspond to the first boss.

Optionally, the toothbrush head body is provided with bristles for brushing teeth.

The present utility model has the following beneficial effects. The structure of the existing electric toothbrush head is improved in that: firstly, the elastic arm is arranged on the tail hood, and by adding the elastic piece structure, the elastic arm is tightly abutted against the driving handle, to ensure the stability of the connection between the driving handle and the tail hood, and to ensure the stable transmission of the vibration energy from the driving handle to the tail hood and then to the toothbrush head body, such that the smooth transmission is realized in the toothbrush head, the noise generation is avoided during the vibration transmission process, the high-frequency vibration of the toothbrush head is realized, and the cleaning effect on teeth is improved; secondly, a silicone sleeve is tightly fitted between the tail hood and the toothbrush head body, and the silicone sleeve can reduce vibration sense and reduce noise, such that the user experience is improved.

BRIEF DESCRIPTION OF DRAWINGS

To more clearly illustrate the technical solutions in the embodiments of the present utility model or in the prior art, the drawings required to be used in the description of the embodiments or the prior art are briefly introduced below. It is obvious that the drawings in the description below are only some embodiments of the present utility model, and those of ordinary skill in the art can obtain other drawings according to structures illustrated in these drawings without creative efforts.

Figure 1:
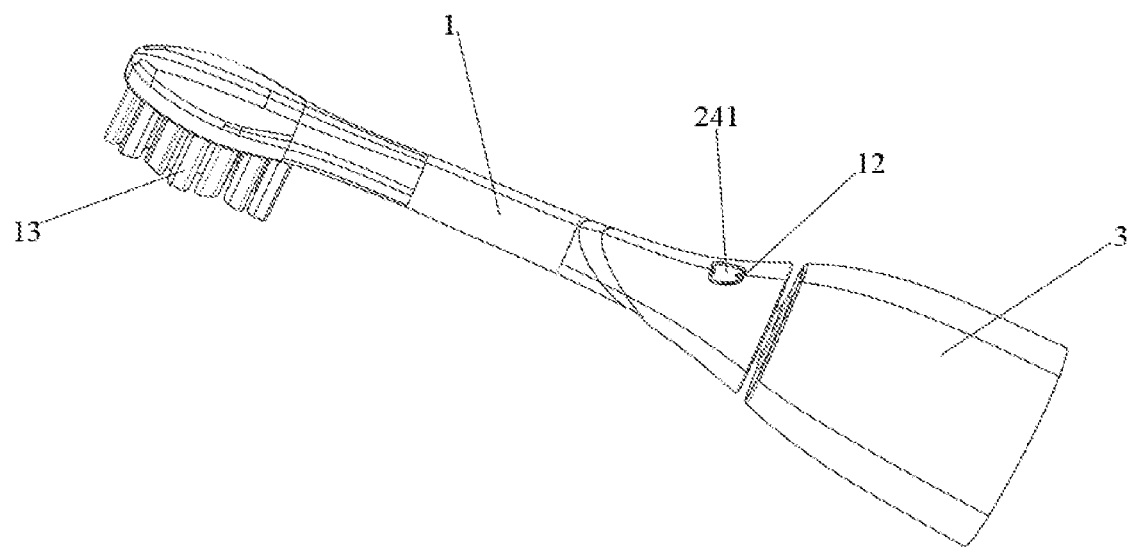
FIG. 1 is a schematic view of an overall structure of an electric toothbrush head according to the present utility model.

The realization of the objectives, the functional features, and the advantages of the present utility model will be further explained in conjunction with the embodiments and with reference to the drawings.

DETAILED DESCRIPTION OF EMBODIMENTS

The technical solutions in the embodiments of the present utility model will be clearly and completely described below with reference to the drawings in the embodiments of the present utility model. It is apparent that the described embodiments are only some, but not all, embodiments of the present utility model. Based on the embodiments of the present utility model, all other embodiments obtained by those of ordinary skill in the art without creative efforts fall within the protection scope of the present utility model.

It should be noted that, if directional indications (such as upper, lower, left, right, front and rear) are involved in the embodiments of the present utility model, the directional indications are only used to explain the relative position relationships, the motion situations and the like between individual components under a certain pose (as shown in the drawings), and if the certain pose is changed, the directional indications are changed accordingly.

In addition, if there are descriptions relating to "first", "second" and the like in the embodiments of the present utility model, the descriptions of "first", "second" and the like are for descriptive purposes only and are not to be construed as indicating or implying relative importance thereof or implicitly indicating the quantities of technical features indicated. Thus, a feature defined by "first" or "second" may explicitly or implicitly include at least one such feature. In addition, "and/or" appearing herein is meant to include three parallel solutions, and taking "A and/or B" as an example, it includes solution A, or solution B, or both solution A and solution B. In addition, the technical solutions among various embodiments may be combined with each other, however, this combination must be based on that it can be realized by those of ordinary skill in the art. When the combination of the technical solutions is contradictory or cannot be realized, such combination of the technical solutions should not be considered to exist, and is not within the protection scope of the present utility model.

Figure 2:
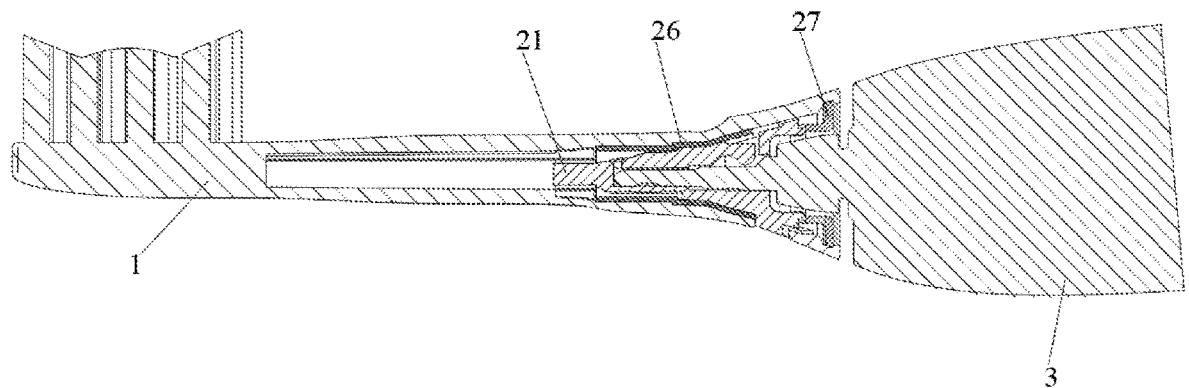
FIG. 2 is a cross-sectional view of an overall structure of an electric toothbrush head according to the present utility model.
Figure 3:
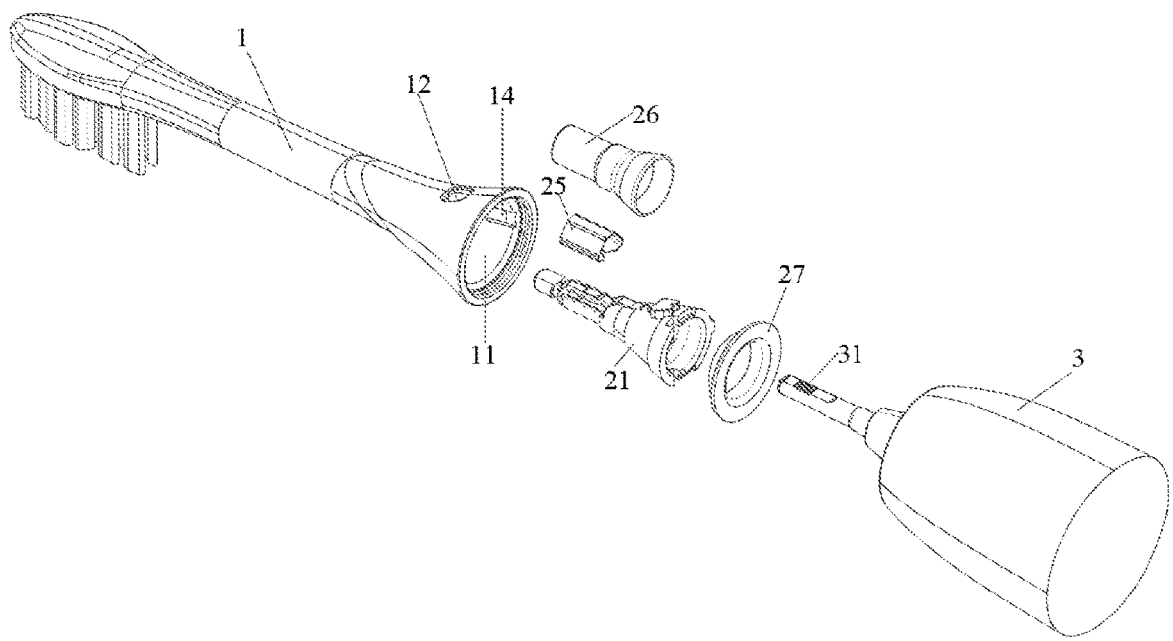
FIG. 3 is an exploded view of an overall structure of an electric toothbrush head according to the present utility model.

Referring to FIGS. 1 to 3, an embodiment of the present utility model provides an electric toothbrush head mounted on a driving handle 3, comprising:

a toothbrush head body 1 provided with a connection hole 11;

a connection component mounted in the connection hole 11 and used to connect the toothbrush head body 1 with the driving handle 3; wherein the connection component comprises a tail hood 21 for being inserted and received in the connection hole 11, and the driving handle 3 is inserted into the tail hood 21; and wherein the tail hood 21 sequentially comprises a front flat part 22, a middle main shell 23, and a tail auxiliary shell 24; the middle main shell 23 is provided with an elastic arm 231, and the elastic arm 231 is provided with a first boss 232 abutted against the driving handle 3; an outer side of the middle main shell 23 is wrapped with an elastic piece 25; an outer side of the tail hood 21 is further sleeved with a silicone sleeve 26, and the tail hood 21 is tightly attached to the connection hole 11 with the silicone sleeve 26.

In this embodiment, the structure of the existing electric toothbrush head is improved to reduce the vibration sense and the noise of the electric toothbrush head, so as to improve the user's hand feel and use experience. Specifically, in this embodiment, the elastic arm 231 is arranged on the tail hood 21, and by adding the elastic piece 25 structure, the elastic piece 25 structure exerts a certain force on the elastic arm 231, and after the driving handle 3 is inserted into the tail hood 21, the first boss 232 of the elastic arm 231 is tightly abutted against the driving handle 3, to ensure the stability of the connection between the driving handle 3 and the tail hood 21, to avoid a relative shaking due to a gap between them, and therefore, to ensure the stable transmission of the vibration energy from the driving handle 3 to the tail hood 21 and then to the toothbrush head body 1, such that the high-frequency vibration of the toothbrush head is realized, and the cleaning effect on teeth is improved.

Further, in this embodiment, a silicone sleeve 26 is further added, and the silicone sleeve 26 is sleeved on the tail hood 21, such that the tail hood 21 is tightly attached to the toothbrush head body 1. Firstly, this can also avoid a relative shaking due to a gap between the tail hood 21 and the toothbrush head body 1, which leads to an unstable vibration transmission. Secondly, the silicone sleeve 26 is a high-performance adsorption material with certain stretch resistance, softness, and automatic rebound, and also has a good sealing and sound insulation effect, such that the silicone sleeve can reduce the overall vibration sense of the toothbrush head through its own elastic deformation, which improves the user's hand feel in use, and meanwhile, the silicone sleeve can filter the noise during vibration and reduce the noise, which improves the user experience.

Figure 4:
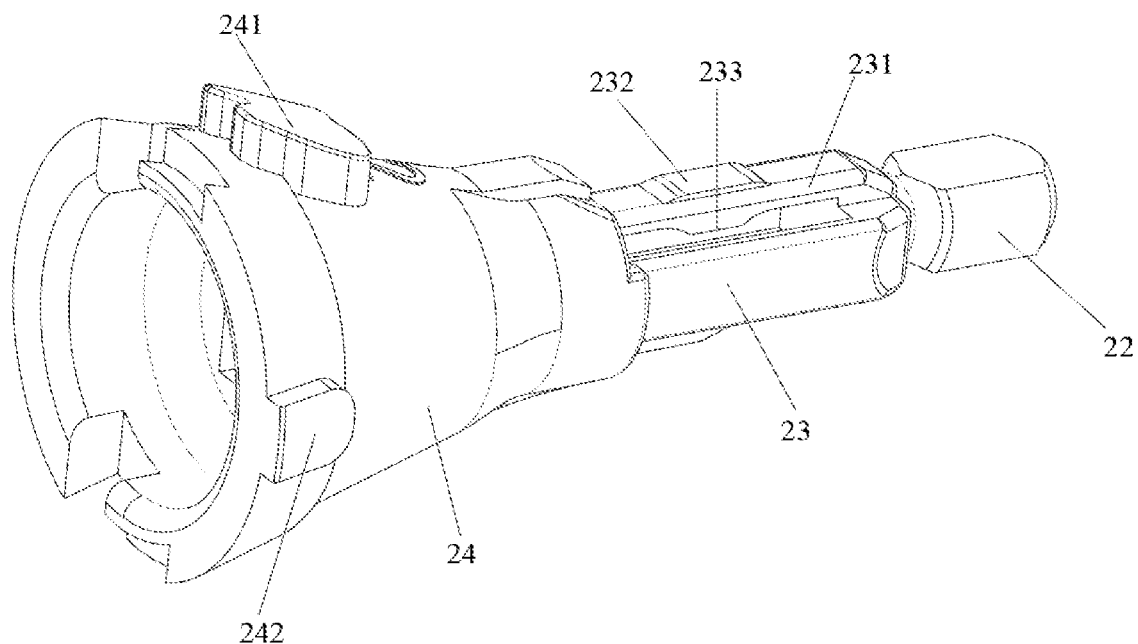
FIG. 4 is a schematic view of a structure of a tail hood according to the present utility model.
Figure 5:
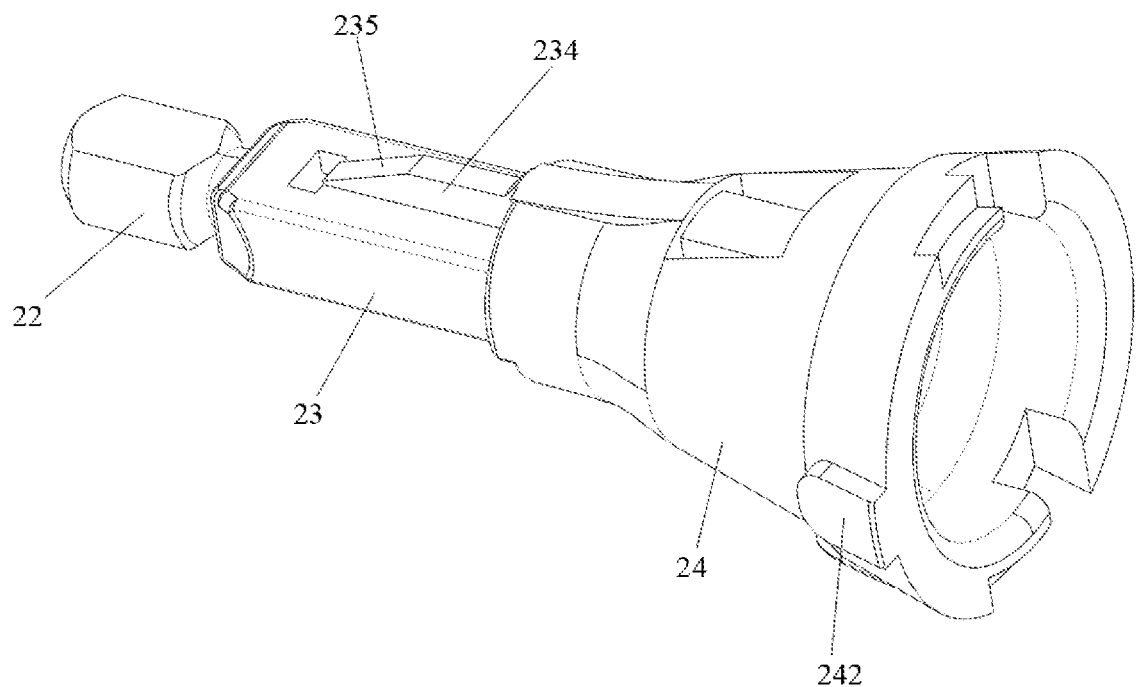
FIG. 5 is a schematic view of a structure of a tail hood according to the present utility model from another perspective.
Figure 6:
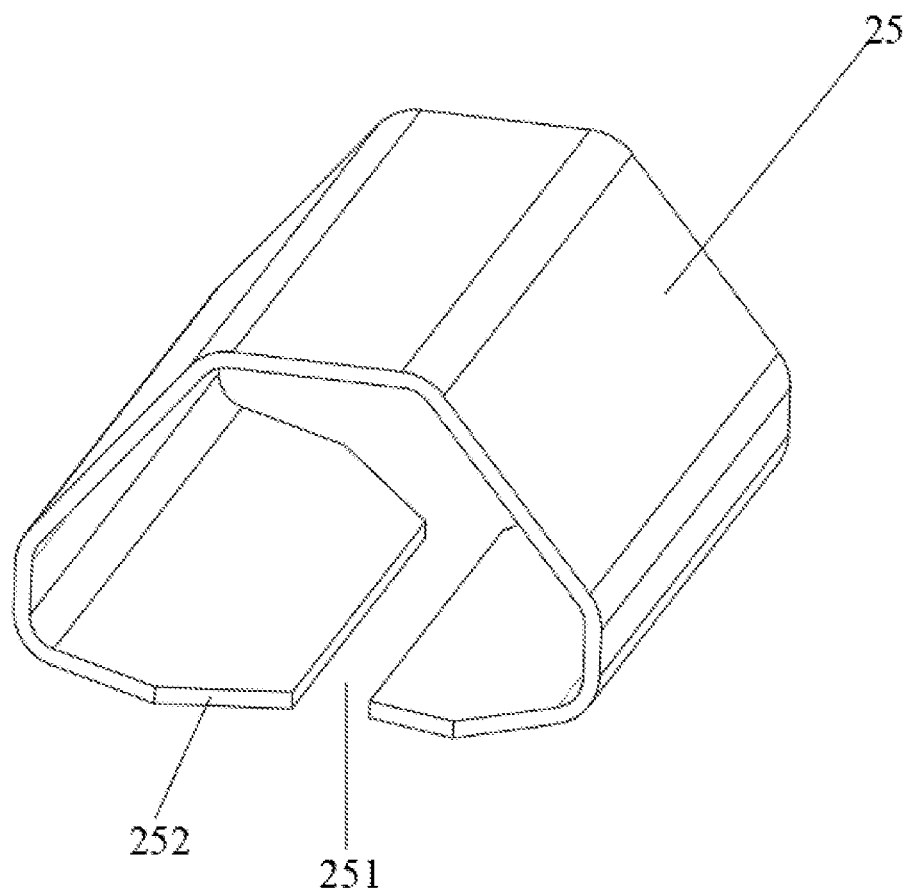
FIG. 6 is a schematic view of a structure of an elastic piece according to the present utility model.

Further, referring to FIGS. 4 and 5, the elastic arm 231 is further provided with a second boss 233, and the second boss 233 is abutted against the elastic piece 25. It should be noted that, the elastic arm 231 is a long strip-shaped structure, and in order to ensure smooth attachment between the elastic arm 231 and the elastic piece 25, in this embodiment, the second boss 233 is added on the elastic arm 231, and the second boss 233 is higher than the elastic arm 231 surface and can be well attached to an inner side of the elastic piece 25, such that the elastic piece 25 is stably and tightly pressed on the elastic arm 231, and the first boss 232 of the elastic arm 231 is abutted against the driving handle 3.

Further, the middle main shell 23 is provided with a guide boss 234, and the connection hole 11 is internally provided with a guide groove (not shown in the figures) adapted to the guide boss 234. The way to connect the tail hood 21 with the toothbrush head body 1 is to insert the tail hood 21 into the connection hole 11 of the toothbrush head body 1. In order to facilitate the mounting, the guide groove is added in the connection hole 11 to guide the guide boss 234, such that the tail hood 21 can be conveniently and quickly inserted into the toothbrush head body 1, and a relative sliding can be prevented between the toothbrush head body 1 and the tail hood 21, thereby avoiding a relative sliding between the driving handle 3 and the toothbrush head body 1, and ensuring the stability of the vibration transmission.

Further, an end that is of the guide boss 234 and that is in proximity to the front flat part 22 is provided with a first chamfer 235, and the guide boss 234 is a cuboid-shaped structure. In order to prevent the guide boss 234 from interfering with the internal structure of the connection hole 11 and affecting the smooth insertion of the guide boss 234 into the connection hole 11, in this embodiment, a front end of the guide boss 234 is provided with the first chamfer 235, which functions to guide the docking of the guide boss 234 with the guide groove, so as to facilitate the smooth insertion of the guide boss 234 into the guide groove.

Further, the elastic piece 25 is provided with a slot 251 for inserting and receiving the guide boss 234. It should be noted that, the elastic piece 25 is wrapped around the outer side of the middle main shell 23. In order to facilitate mounting the elastic piece 25, in this embodiment, the elastic piece 25 is provided as a C-shaped structure for inserting and receiving the middle main shell 23, and the slot 251 formed in the middle is an avoidance slot corresponding to the guide boss 234, which facilitates the smooth insertion of the middle main shell 23 into the elastic piece 25. Also, providing the slot 251 allows the elastic piece 25 to have a certain deformation ability, so as to better adapt to the size of the middle main shell 23, allowing them to be better attached.

Further, an end of the slot 251 is provided with a second chamfer 252. By providing the second chamfer 252, a certain guide effect is formed on the guide boss 234 when inserted into the slot 251, such that the interference between the guide boss and the slot is avoided, and the mounting of the elastic piece 25 is facilitated.

Further, the silicone sleeve 26 is sleeved on the outer side of the middle main shell 23 and an outer side of the tail auxiliary shell 24. It should be noted that, the front flat part 22 of the tail hood 21 is inserted deep into the connection hole 11, such that a relative rotation between the tail hood 21 and the toothbrush head body 1 is prevented. However, the structure of the tail hood 21 mostly belongs to the middle main shell 23 and the tail auxiliary shell 24, and as a result, sleeving the silicone sleeve 26 on the middle main shell 23 and the tail auxiliary shell 24 allows most contact area between the tail hood 21 and the connection hole 11 to be wrapped with the silicone sleeve 26, thereby improving the tightness between the tail hood and the connection hole.

Further, the outer side of the tail auxiliary shell 24 is provided with a locking boss 241, and the toothbrush head body is provided with a locking hole 12 for clamping engagement with the locking boss 241. After the tail hood 21 is mounted in place, the locking boss 241 is in clamping engagement with the locking hole 12, such that the movement of the tail hood 21 can be limited, so as to prevent the tail hood 21 from falling off from the toothbrush head body 1, which ensures the stability of the structure.

Further, the outer side of the tail auxiliary shell 24 is further provided with a fool-proof boss 242, and an inner side of the connection hole 11 is provided with a fool-proof slot 14 for clamping engagement with the fool-proof boss 242. It should be noted that, the elastic arm 231 and the guide boss 234 of the tail hood 21 are symmetrically arranged on two sides of the tail hood, and the elastic arm 231 and the guide boss 234 are required to correspond to the elastic piece 25 and the guide groove respectively, so the mounting positions of the elastic arm and the guide boss are fixed. In order to prevent the user from reversely mounting the tail hood 21 and failing to smoothly mount the tail hood 21 into the connection hole 11, in this embodiment, the fool-proof boss 242 is added on the outer side of the tail auxiliary shell 24 for clamping engagement with the fool-proof slot 14 in the connection hole 11, such that the mounting direction of the tail hood 21 is fixed, thereby avoiding the user from mistakenly mounting the tail hood.

Further, the connection component further comprises an iron ring 27 for connection with an end of the tail auxiliary shell 24, and the iron ring 27 is arranged between the tail auxiliary shell 24 and the driving handle 3, to further prevent a relative shaking between the tail hood 21 and the driving handle 3, which ensures the stability of the structure.

Further, the driving handle 3 is provided with several anti-slip grooves 31, and the anti-slip grooves 31 correspond to the first boss 232. By adding the anti-slip grooves 31 on the driving handle 3 to correspond to the first boss 232, the friction between the anti-slip grooves and the first boss can be increased, so as to prevent a relative movement between the driving handle 3 and the tail hood 21, which ensures the stability of the structure.

Further, the toothbrush head body is provided with bristles 13 for brushing teeth.

The above mentioned contents are only optional embodiments of the present utility model and are not intended to limit the patent scope of the present utility model, and under the utility model concept of the present utility model, the equivalent structural transformations made by using the contents of the specification and the drawings of the present utility model, or direct/indirect applications to other related technical fields, are all included in the patent protection scope of the present utility model.

The invention claimed is:

1. An electric toothbrush head mounted on a driving handle, comprising:
a toothbrush head body provided with a connection hole;
a connection component mounted in the connection hole and used to connect the toothbrush head body with the driving handle; wherein the connection component comprises a tail hood for being inserted and received in the connection hole, and the driving handle is inserted into the tail hood; and wherein
the tail hood sequentially comprises a front flat part, a middle main shell, and a tail auxiliary shell; the front flat part is used to prevent a relative rotation between the tail hood and the connection hole, the middle main shell is provided with an elastic arm, the elastic arm is used to press the driving handle tight, and the elastic arm is provided with a first boss abutted against the driving handle; an outer side of the middle main shell is wrapped with an elastic piece, and the elastic piece is used to press the elastic arm tight on the driving handle; an outer side of the tail hood is further sleeved with a silicone sleeve, the silicone sleeve is used for filtering and shock absorption, and the tail hood is tightly attached to the connection hole with the silicone sleeve.

2. The electric toothbrush head according to claim 1, wherein the elastic arm is further provided with a second boss, and the second boss is abutted against the elastic piece.

3. The electric toothbrush head according to claim 1, wherein the middle main shell is provided with a guide boss, and the connection hole is internally provided with a guide groove adapted to the guide boss.

4. The electric toothbrush head according to claim 3, wherein an end that is of the guide boss and that is in proximity to the front flat part is provided with a first chamfer.

5. The electric toothbrush head according to claim 3, wherein the elastic piece is provided with a slot for inserting and receiving the guide boss.

6. The electric toothbrush head according to claim 5, wherein an end of the slot is provided with a second chamfer.

7. The electric toothbrush head according to claim 1, wherein the silicone sleeve is sleeved on the outer side of the middle main shell and an outer side of the tail auxiliary shell.

8. The electric toothbrush head according to claim 1, wherein the outer side of the tail auxiliary shell is provided with a locking boss, and the toothbrush head body is provided with a locking hole for clamping engagement with the locking boss.

9. The electric toothbrush head according to claim 1, wherein the outer side of the tail auxiliary shell is further provided with a fool-proof boss, and an inner side of the connection hole is provided with a fool-proof slot for clamping engagement with the fool-proof boss.

10. The electric toothbrush head according to claim 1, wherein the connection component further comprises an iron ring for connection with an end of the tail auxiliary shell, and the iron ring is arranged between the tail auxiliary shell and the driving handle.

11. The electric toothbrush head according to claim 1, wherein the driving handle is provided with several anti-slip grooves, and the anti-slip grooves correspond to the first boss.

12. The electric toothbrush head according to claim 1, wherein the toothbrush head body is provided with bristles for brushing teeth.

* * * * *